US011124097B2

(12) United States Patent
Caye (10) Patent No.: US 11,124,097 B2
(45) Date of Patent: Sep. 21, 2021

(54) VEHICLE SEATING ASSEMBLY

(71) Applicant: Ford Global Technologies, LLC, Dearborn, MI (US)

(72) Inventor: Mark Caye, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 51 days.

(21) Appl. No.: 16/747,088

(22) Filed: Jan. 20, 2020

(65) Prior Publication Data

US 2021/0221262 A1    Jul. 22, 2021

(51) Int. Cl.
*B60N 2/30* (2006.01)
*B60N 2/90* (2018.01)
*B60N 2/02* (2006.01)

(52) U.S. Cl.
CPC ........... *B60N 2/3045* (2013.01); *B60N 2/305* (2013.01); *B60N 2/933* (2018.02); *B60N 2002/0216* (2013.01); *B60N 2002/952* (2018.02)

(58) Field of Classification Search
None
See application file for complete search history.

(56) References Cited

U.S. PATENT DOCUMENTS

| 4,629,252 | A | 12/1986 | Myers et al. | |
|---|---|---|---|---|
| 6,739,668 | B2 | 5/2004 | Coman et al. | |
| 2014/0306479 | A1* | 10/2014 | Abe | B60N 2/3013 |
| | | | | 296/65.09 |
| 2015/0251569 | A1* | 9/2015 | Kanai | B60N 2/06 |
| | | | | 297/325 |

FOREIGN PATENT DOCUMENTS

EP    0738624 A1    10/1996

* cited by examiner

*Primary Examiner* — David E Allred
(74) *Attorney, Agent, or Firm* — David Coppiellie; Price Heneveld LLP (57) ABSTRACT

A latch assembly for a vehicle seating assembly includes a support plate having an arm. The arm defines a receiving well. A retention member is coupled with the support plate. A latch member is operably coupled with a seat base frame and the arm of the support plate. The latch member is selectively engaged with the retention member. A release assembly is operably coupled with the latch member. The release assembly includes a latch link coupled with the latch member at a first end. A rod link is rotatably coupled with a second end of the latch link and is fixedly coupled with a torque rod. Movement of the first end of the latch link toward a front of the seat base frame is configured to rotate the latch member and the torque rod.

10 Claims, 9 Drawing Sheets

VEHICLE SEATING ASSEMBLY

FIELD OF THE DISCLOSURE

The present disclosure generally relates to a vehicle seating assembly, and more specifically to a latch assembly for a vehicle seating assembly.

BACKGROUND OF THE DISCLOSURE

Vehicle seating assemblies often need to be compactable to provide additional uses for space within the vehicle. This may be accommodated by releasing a single latch assembly to fold the vehicle seating assembly.

SUMMARY OF THE DISCLOSURE

According to one aspect of the present disclosure, a vehicle seating assembly includes a first latch assembly positioned on a first side of a vehicle seat frame and having a first latch member. A second latch assembly is positioned on a second, opposing side of the vehicle seat frame and has a second latch member. The first latch assembly is configured to be released simultaneously with the second latch assembly. A torque rod extends between the first and second latch assemblies. A first release assembly is operably coupled with the first latch assembly. The first release assembly includes a first latch link operably coupled with a first latch member. A first rod link is operably coupled with the first latch link and a first end of the torque rod. A second release assembly is operably coupled with the second latch assembly. The second release assembly includes a second latch link operably coupled with a second latch member. A second rod link is operably coupled with the second latch link and a second end of the torque rod.

Embodiments of this aspect of the disclosure, or any other aspect disclosed, can include any one or a combination of the following features:

- an actuator operably coupled with one of first and second release assemblies and configured to actuate the first and second release assemblies between first and second positions;
- a first support plate coupled with a first side of a vehicle seat frame and a first latch assembly, and a second support plate coupled with a second side of the vehicle seat frame and a second latch assembly;
- a first retention member coupled with a first support plate and configured to be selectively engaged with a first latch member, and a second retention member coupled with a second support plate and configured to be selectively engaged with a second latch member; and/or
- a first latch member including a first hook configured to be selectively engaged with a first retention member and a first arm operably coupled with a first latch link, and a second latch member including a second hook configured to be selectively engaged with a second retention member and a second arm operably coupled with a second latch link.

According to another aspect of the present disclosure, a vehicle seat frame includes a seat base frame operably coupled with a support plate. A latch assembly is operably coupled with the seat base frame and the support plate. The latch assembly includes a latch member rotatably coupled with the seat base frame and the support plate. A retention member is fixedly coupled with the support plate. The latch member is selectively engaged with the retention member. A release assembly is operably coupled with the latch. The release assembly includes a latch link having a first end coupled with the latch assembly. A rod link is rotatably coupled with a second end of the latch link and a torque rod. An actuator is configured to move a first end of the latch link towards a front of the seat base frame when a forward force is applied to the actuator.

Embodiments of this aspect of the disclosure, or any other aspect disclosed, can include any one or a combination of the following features:

- a latch member configured to be rotated between an engaged position and a disengaged position;
- a spring coupled with a latch member and configured to bias the latch member into an engaged position;
- a latch member operably coupled with a first end of a latch link;
- movement of a first end of the latch link towards a front of a seat base frame is configured to push a second end of the latch link upward;
- upward movement of a second end of the latch link is configured to rotate an end of a rod link and a torque rod;
- inner and outer spacers positioned on opposing sides of a latch member and spaced apart by a stop;
- a retention member defining a guide configured to receive a stop;
- a stop configured to move along a guide and limit rotation of a latch assembly; and/or
- a retention member defining a retention hook and the latch member defines a latch hook configured to be engaged with the retention hook when the latch member is in the engaged position.

According to another aspect of the present disclosure, a latch assembly for a vehicle seating assembly includes a support plate having an arm. The arm defines a receiving well. A retention member is coupled with the support plate. A latch member is operably coupled with a seat base frame and the arm of the support plate. The latch member is selectively engaged with the retention member. A release assembly is operably coupled with the latch member. The release assembly includes a latch link coupled with the latch member at a first end. A rod link is rotatably coupled with a second end of the latch link and is fixedly coupled with a torque rod. Movement of the first end of the latch link toward a front of the seat base frame is configured to rotate the latch member and the torque rod.

Embodiments of this aspect of the disclosure, or any other aspect disclosed, can include any one or a combination of the following features:

- inner and outer spacers positioned to frame a retention member and a latch member;
- a spring positioned about the latch member and configured to bias the latch member into a latched position;
- ends of a spring coupled with inner and outer spacers; and/or
- an actuator operably coupled with a first end of a latch link and configured to apply a forward pulling force on the first end of the latch link.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION OF THE PREFERRED EMBODIMENTS

The present illustrated embodiments reside primarily in combinations of method steps and apparatus components related to a latch assembly for a vehicle seating assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Figure 1:
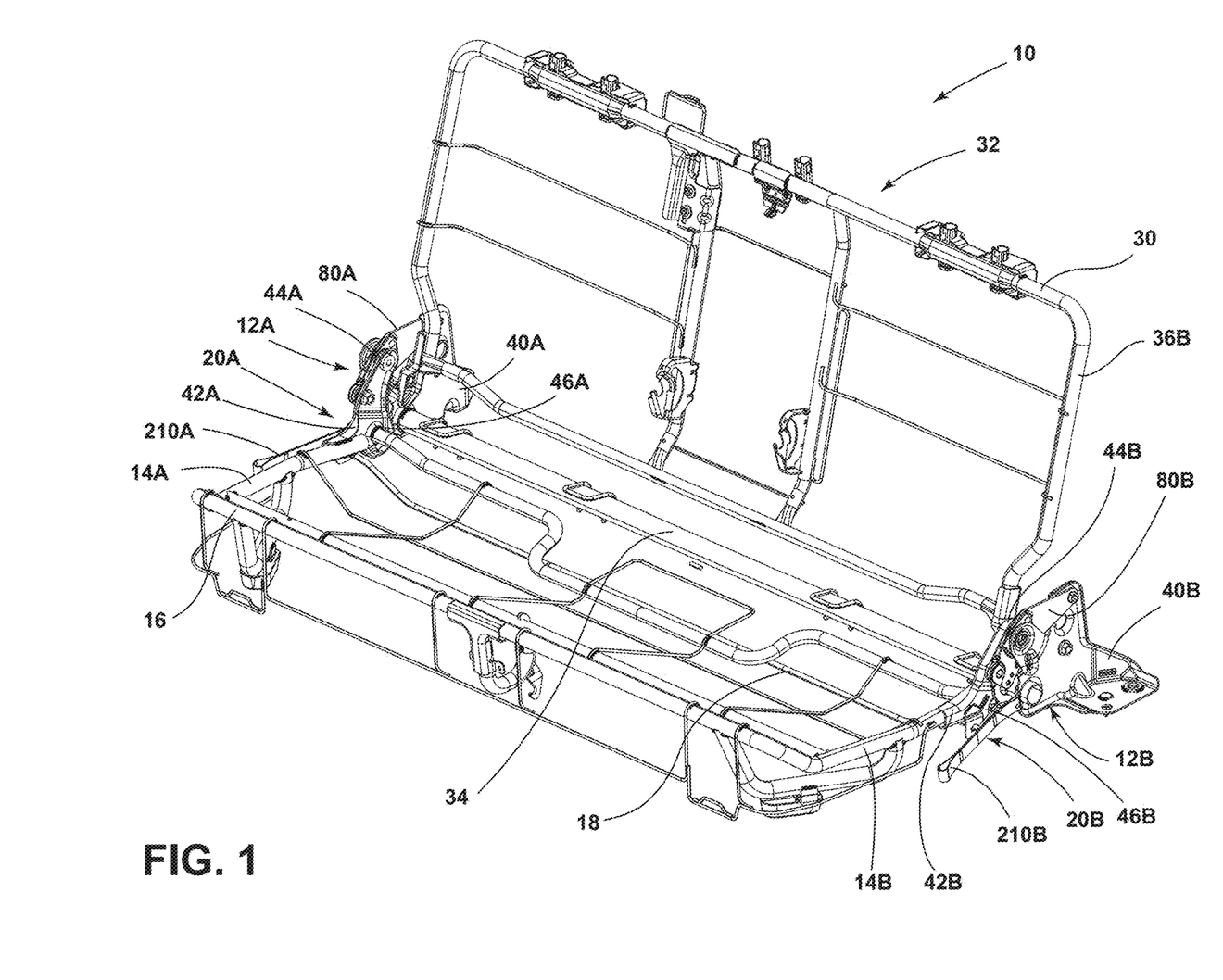
FIG. 1 is a top perspective view of a frame of a vehicle seating assembly, according to various examples.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring now to FIGS. 1-5B, reference number 10 generally designates a vehicle seating assembly. The vehicle seating assembly 10 includes a first latch assembly 12A positioned on a first side 14A of a seat base frame 16. A second latch assembly 12B is positioned on a second, opposing side 14B of the seat base frame 16. The release of the first latch assembly 12A is configured to be simultaneous with the release of the second latch assembly 12B. A torque rod 18 extends between, and is operably coupled with, the first and second latch assemblies 12A, 12B. A first release assembly 20A is configured to release the first latch assembly 12A. The first release assembly 20A includes a first latch link 22A coupled with a first latch member 28A of the first latch assembly 12A. A first rod link 24A is rotatably coupled with the first latch link 22A and is fixedly coupled with a first end 26A of the toque rod 18. A second release assembly 20B is configured to release the second latch assembly 12B. The second release assembly 20B includes a second latch link 22B rotatably coupled with a second latch member 28B of the second latch assembly 12B. A second rod link 24B is rotatably coupled with the second latch link 22B and is fixedly coupled with a second end 26B of the toque rod 18.

Figure 5A:
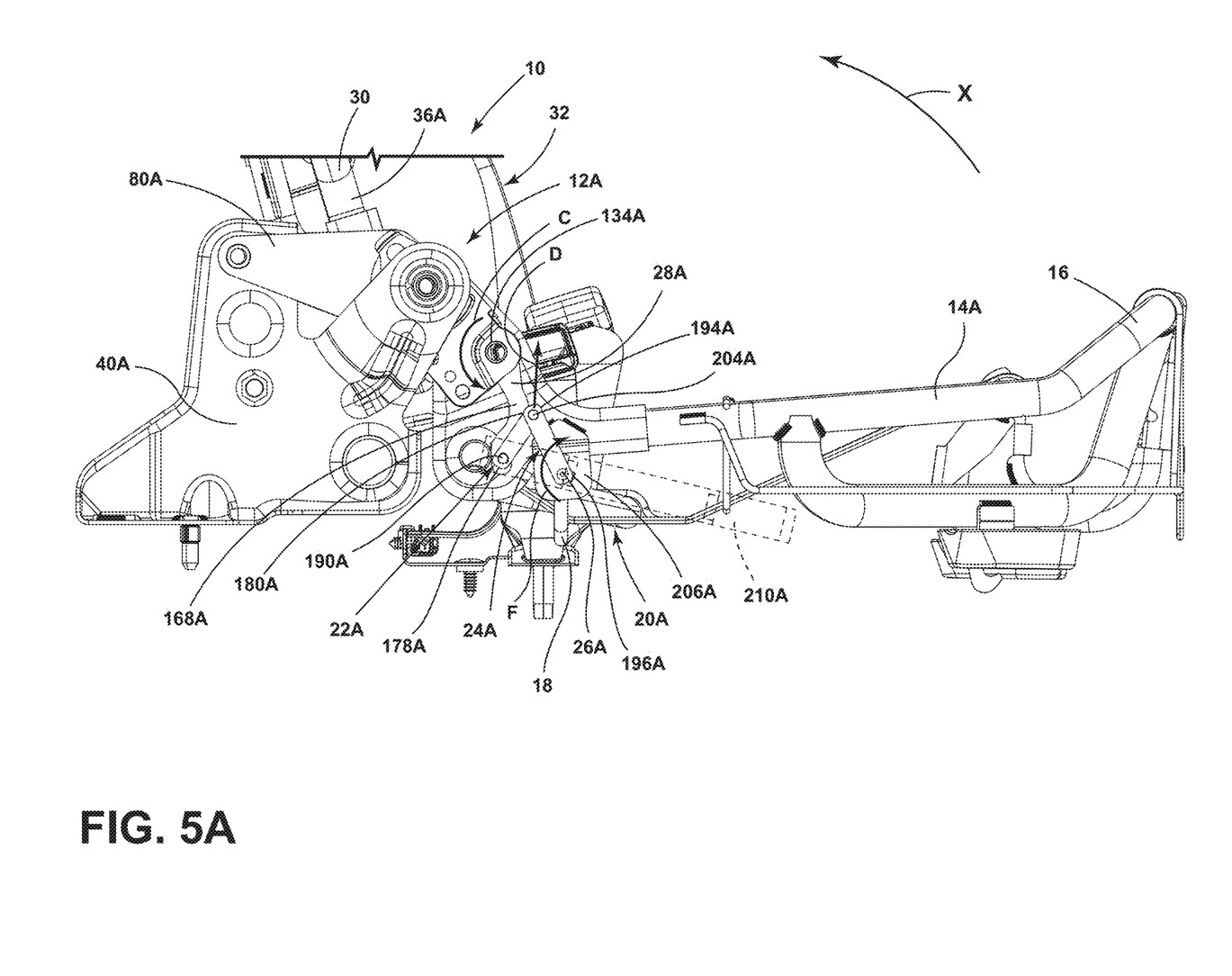
FIG. 5A is a side elevational view of the first latch assembly of FIG. 2A in a second position.
Figure 5B:
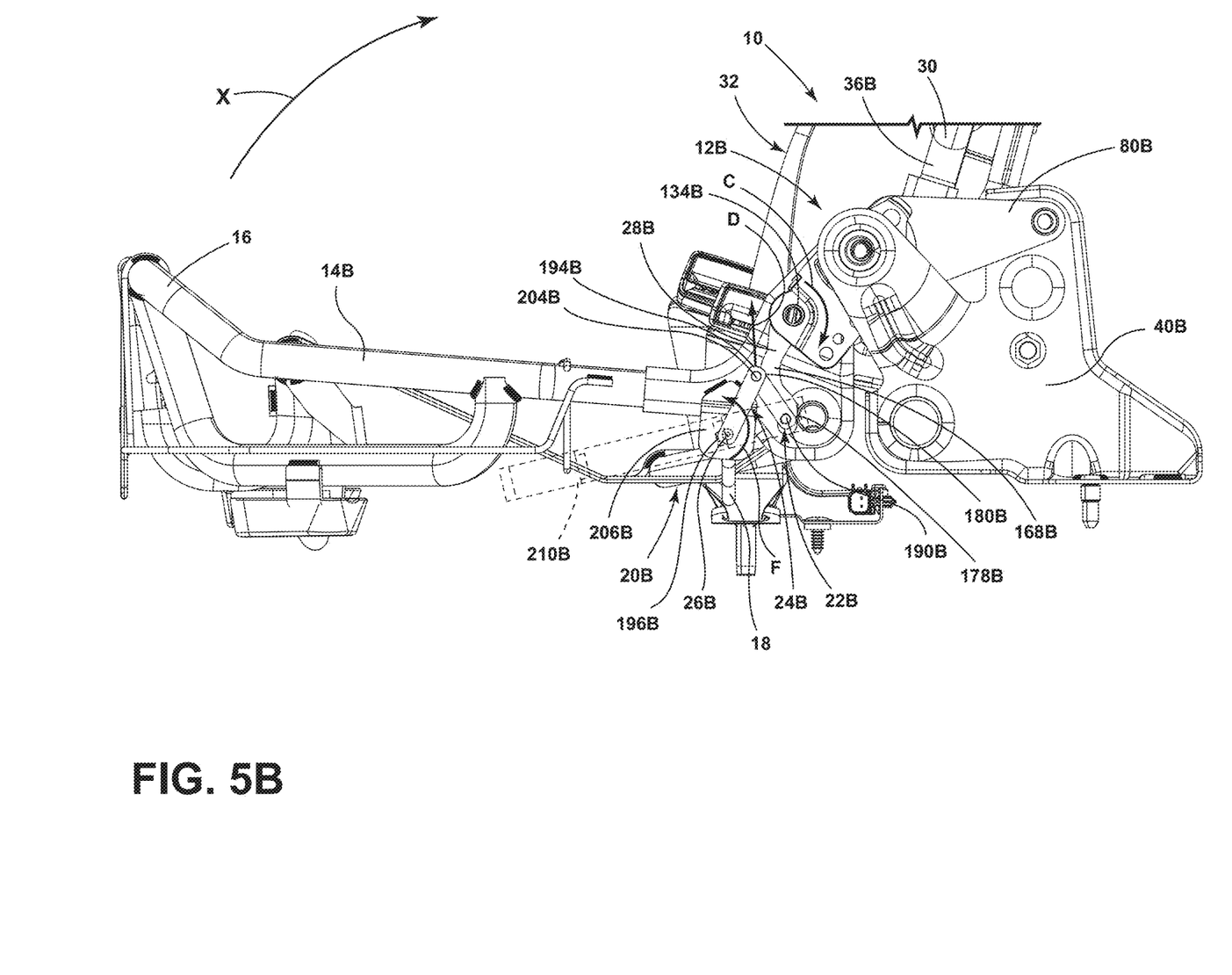
FIG. 5B is a side elevational view of the second latch assembly of FIG. 2B in a second position.

Referring now to FIG. 1, the vehicle seating assembly 10 is illustrated including a seatback frame 30 and the seat base frame 16 forming a seat frame assembly 32. The seat base frame 16 is operably coupled to the seatback frame 30 and is supported by first and second support plates 40A, 40B. The first support plate 40A is positioned on the first side 14A of the seat base frame 16, and the second support plate 40B is positioned on the second side 14B of the seat base frame 16. The first and second support plates 40A, 40B are rotatably coupled with the seat base frame 16 such that the seat base frame 16 is rotatable along a path indicated by arrow X (FIGS. 5A and 5B).

The first and second support plates 40A, 40B are further coupled with the seatback frame 30. As illustrated, the first and second latch assemblies 12A, 12B and corresponding first and second release assemblies 20A, 20B are illustrated in use with a seat frame assembly 32 of a bench seat. However, it is contemplated that the first and second latch assemblies 12A, 12B and corresponding first and second release assemblies 20A, 20B may be used within alternative types of seating assemblies 10 and/or seat frame assemblies 32, including, for example, elevated bucket seats, and/or may be coupled with seating assemblies 10 and/or seat frame assemblies 32 that may be found at various locations within a vehicle, including, for example, a rear location, a mid-row location, or a front seat location. It is also understood that the first and second latch assemblies 12A, 12B and corresponding first and second release assemblies 20A, 20B may be incorporated in seating assemblies 10 for any vehicle type, such as a sedan, a truck, an SUV, a van, or other vehicles without departing from the scope of the present disclosure.

Figure 2A:
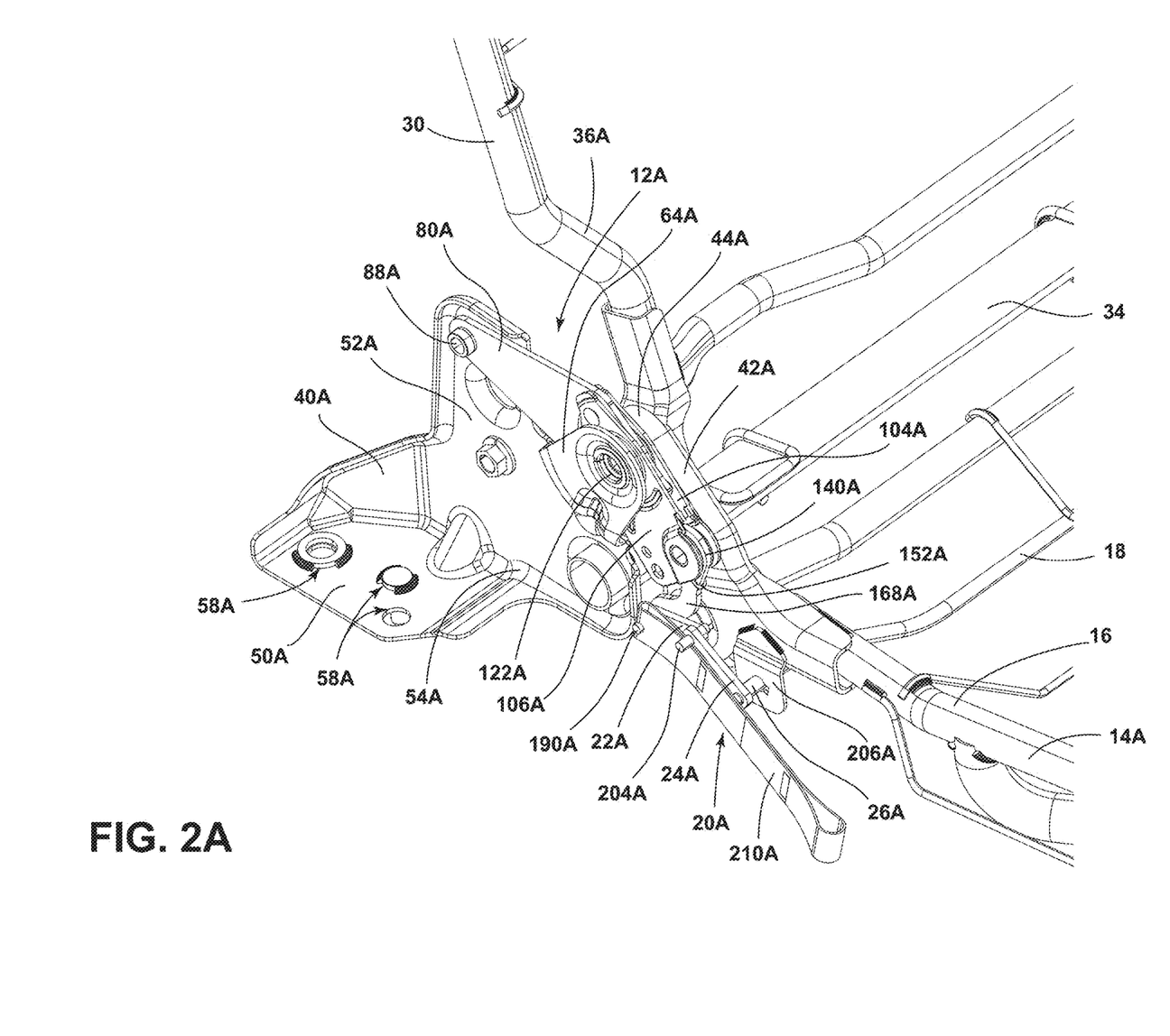
FIG. 2A is an enlarged side perspective view of a first latch assembly of the vehicle seating assembly of FIG. 1.
Figure 2B:
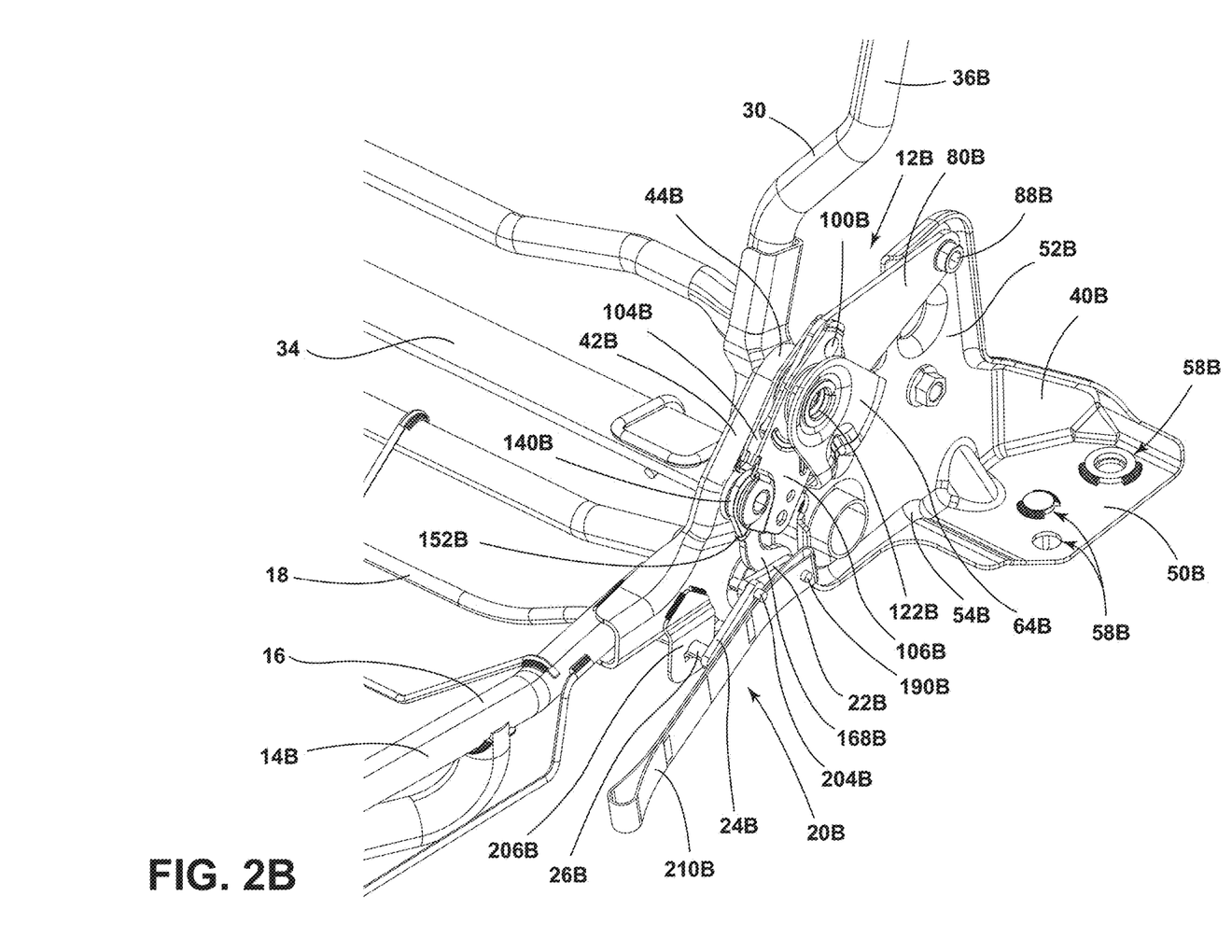
FIG. 2B is an enlarged side perspective view of a second latch assembly of the vehicle seating assembly of FIG. 1.

Referring now to FIGS. 1-2B, the seat base frame 16 includes a cross-bar 34 extending between the first and second sides 14A, 14B of the seat base frame 16. The cross-bar 34 is operably coupled with first and second mounting plates 42A, 42B positioned on the first and second sides 14A, 14B of the seat base frame 16, respectively. The cross-bar 34 is coupled with the first mounting plate 42A proximate a lower end 46A of the first mounting plate 42A and is coupled with the second mounting plate 42B proximate a lower end 46B of the second mounting plate 42B. The first mounting plate 42A is further operably coupled with the first support plate 40A at an upper end 44A of the first mounting plate 42A, and the second mounting plate 42B is operably coupled with the second support plate 40B at an upper end 44B of the second mounting plate 42B. For example, the first mounting plate 42A may be coupled with the first support plate 40A, and the second mounting plate 42B may be coupled with the second support plate 40B.

The seatback frame 30 includes a first side 36A and a second side 36B corresponding with the first and second sides 14A, 14B of the seat base frame 16. Each of the first and second sides 14A, 14B are operably coupled with one of the first and second support plates 40A, 40B, respectively. The first and second support plates 40A, 40B are configured to support first and second latch assemblies 12A, 12B and to provide a base for the seat frame assembly 32. It will be understood that the first and second latch assemblies 12A, 12B are substantially the same on either side of the seat frame assembly 32 (e.g., the first latch assembly 12A is mirrored to the second latch assembly 12B). Thus, although only the first latch assembly 12A will be described in detail below with reference to FIGS. 2A, 3A, 4A, and 5A, it will be understood that the same description of the components, connections, and inner workings of the first latch assembly 12A would be true of the second latch assembly 12B. As such, FIGS. 2B, 3B, 4B, and 5B have also been labeled with similar numbers where the parts are similar (e.g., the first latch assembly 12A includes a retention member 50A and the second latch assembly 12B includes a retention member 50B).

Figure 3A:
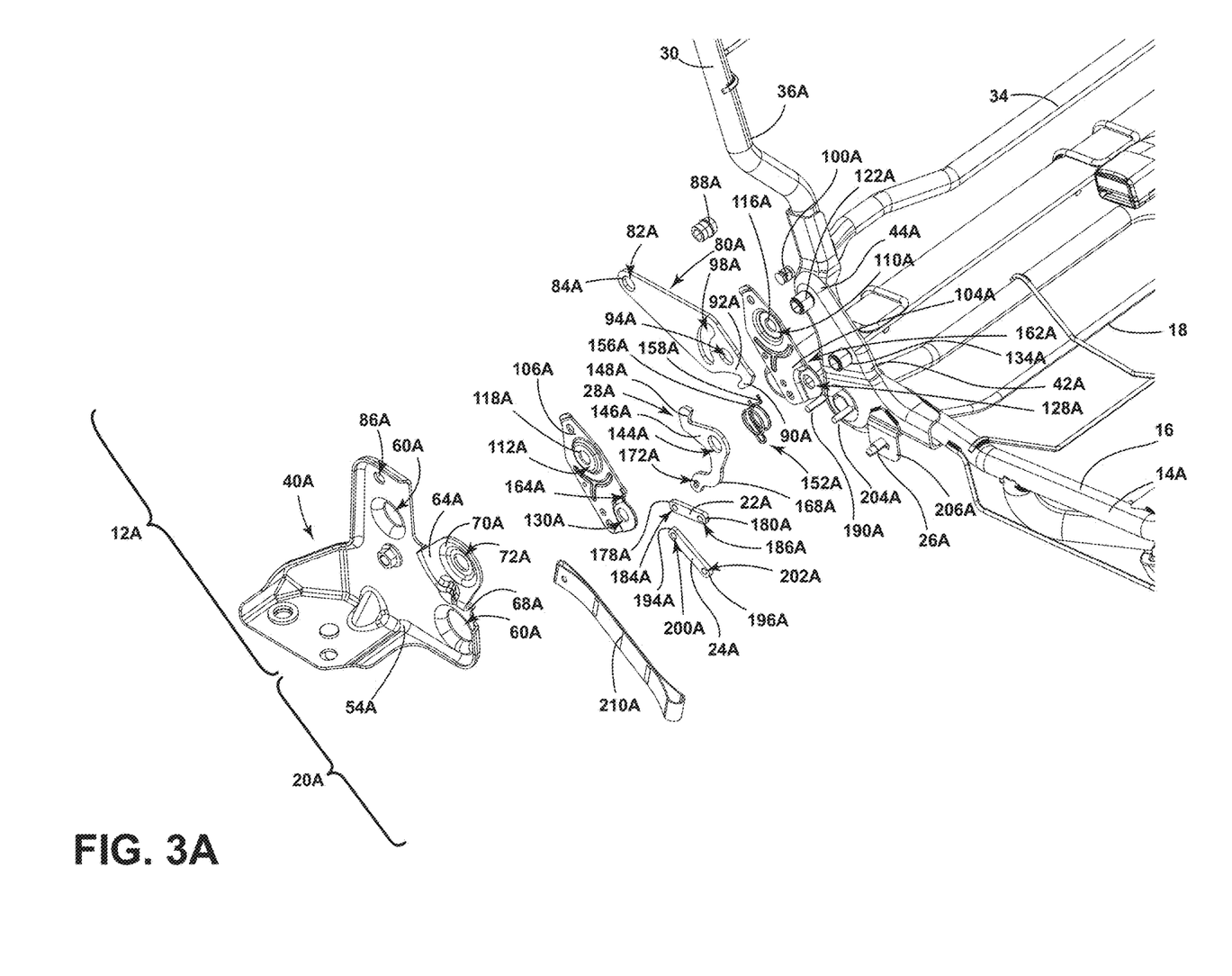
FIG. 3A is an exploded perspective view of the first latch assembly of FIG. 2A.
Figure 3B:
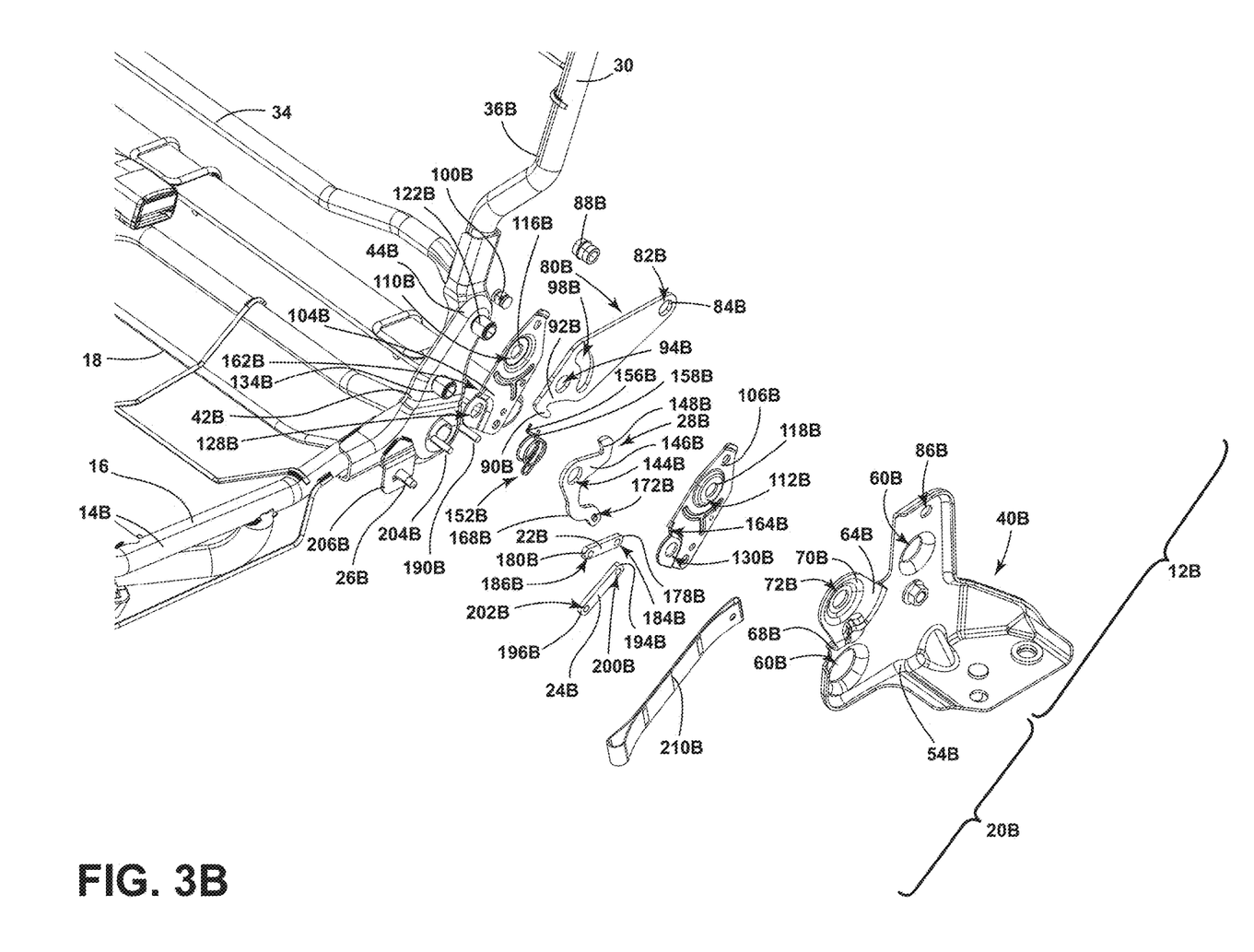
FIG. 3B is an exploded perspective view of the second latch assembly of FIG. 2B.

Referring now to FIGS. 2A and 3A, the first latch assembly 12A is illustrated operably coupled with the first side 14A of the seat base frame 16 and the first support plate 40A. The first support plate 40A includes a base 50A and a sidewall 52A. The sidewall 52A extends upward from an interior edge 54A of the base 50A proximate the seat frame assembly 32. In various examples, the sidewall 52A may be oriented such that the first support plate 40A is generally L-shaped. However, it is contemplated that the first support plate 40A may have any shape without departing from the scope of the present disclosure.

As illustrated, the base 50A of the first support plate 40A defines a plurality of support apertures 58A configured to receive fasteners to couple the first support plate 40A with a portion of a vehicle (e.g., a vehicle floor). Further, the sidewall 52A of the first support plate 40A includes a plurality of connection apertures 60A, 86A. Each connection aperture 60A, 86A is configured to receive one of a plurality of pins, fasteners, or frame components as described in more detail below. A connection arm 64A extends from the sidewall 52A of the support plate 40A and includes an extension portion 68A and a connection portion 70A. The extension portion 68A extends substantially perpendicularly from the sidewall 52A. The connection portion 70A extends from the extension portion 68A and is oriented substantially parallel to the sidewall 52A of the first support plate 40A. The connection portion 70A defines a receiving well 72A configured to be operably coupled with at least a portion of the second latch assembly 12B. The connection arm 64A is further configured to at least partially surround the first latch assembly 12A when the first latch assembly 12A is coupled with the first support plate 40A.

Referring still to FIGS. 2A and 3A, the first latch assembly 12A includes a retention member 80A. The retention member 80A is generally elongated and, as illustrated, may have a generally trapezoidal shape. A first through-hole 82A is defined proximate a first apex 84A of the retention member 80A and is configured to be aligned with an upper connection aperture 86A of the sidewall 52A of the support plate 40A.

A fastener 88A is configured to be positioned through the first through-hole 82A of the retention member 80A and through the upper connection aperture 86A of the sidewall 52A. The fastener 88A is configured to couple the retention member 80A with the first support plate 40A. When the retention member 80A is coupled with the first support plate 40A, an upper edge of the retention member 80A may be substantially aligned with an upper edge of the sidewall 52A of the first support plate 40A.

As illustrated in FIG. 3A, the retention member 80A may further include a retention hook 90A extending from a second apex 92A of the retention member 80A. The second apex 92A is positioned opposite the first apex 84A. The retention member 80A further defines a second through-hole 94A between the first apex 84A and the second apex 92A. The second through-hole 94A is configured to align with the receiving well 72A of the connection arm 64A of the first support plate 40A when the retention member 80A is coupled with the first support plate 40A by the fastener 88A. The second through-hole 94A is further aligned with the upper end 44A of the first mounting plate 42A.

A guide 98A is further defined by the retention member 80A between the first apex 84A and the second apex 92A. As illustrated, the guide 98A may be positioned proximate the second through-hole 94A. The guide 98A is generally arcuate and is configured to receive a stop 100A, as discussed in more detail below.

Referring again to FIGS. 2A and 3A, the first latch assembly 12A further includes inner and outer spacers 104A, 106A positioned on either side of the retention member 80A. Each of the inner and outer spacers 104A, 106A defines a rotation opening 110A, 112A. The rotation openings 110A, 112A of the inner and outer spacers 104A, 106A are configured to be aligned with the second through-hole 94A of the retention member 80A. The rotation openings 110A, 112A are further aligned with the receiving well 72A of the connection arm 64A of the first support plate 40A. In various examples, the inner and outer spacers 104A, 106A may each include a rim 116A, 118A surrounding the respective rotation opening 110A, 112A. The rim 116A, 118A of each of the inner and outer spacers 104A, 106A is configured to space the retention member 80A away from the connection arm 64A of the first support plate 40A and the first mounting plate 42A.

A first pin 122A is operably coupled with the upper end 44A of the first mounting plate 42A. The first pin 122A may be fixedly coupled with the first mounting plate 42A or may be integrally formed with the first mounting plate 42A. The first pin 122A is configured to be received by the rotation opening 110A, 12A of each of the inner and outer spacers 104A, 106A and is further configured to be received by the second through-hole 94A of the retention member 80A. When the first pin 122A is received by the rotation openings 110A, 112A and the second through-hole 94A, the first pin 122A further extends through the receiving well 72A of the connection arm 64A of the first support plate 40A. The first pin 122A is configured to rotatably couple the seat base frame 16 with the first support plate 40A.

Referring still to FIGS. 2A and 3A, each of the inner and outer spacers 104A, 106A is further coupled with the stop 100A at a first end of the respective spacer 104A, 106A such that the stop 100A extends between the inner and outer spacers 104A, 106A. When the retention member 80A is positioned between the inner and outer spacers 104A, 106A, the stop 100A extends through the generally arcuate guide 98A and is retained within, and movable along, the guide 98A. The stop 100A is further configured to retain the retention member 80A between the spacers 104A, 106A of the first latch assembly 12A. The stop 100A and guide 98A are configured to prevent over-rotation of the seat base frame 16 relative to the seatback frame 30 and the first support plate 40A. In other words, the stop 100A and the guide 98A are configured to engage so that the seat base frame 16 is limited in the degree of rotation available.

Each of the inner and outer spacers 104A, 106A further includes a lower opening 128A, 130A proximate a second end of the respective spacer 104A, 106A. The lower openings 128A, 130A are aligned and configured to receive a second pin 134A. The second pin 134A may be fixedly coupled with the first mounting plate 42A or may be integrally formed with the first mounting plate 42A.

As illustrated in FIGS. 2A and 3A, the first latch member 28A is positioned between the inner and outer spacers 104A, 106A and defines an aperture 144A. The aperture 144A is aligned with the lower openings 128A, 130A of the inner and outer spacers 104A, 106A and is configured to receive the second pin 134A. The second pin 134A acts to retain the latch member 28A between the inner and outer spacers 104A, 106A, and the first latch member 28A is rotatable about the second pin 134A.

The first latch member 28A of the first latch assembly 12A includes a body 146A that defines the aperture 144A. The aperture 144A is configured to be aligned with the lower openings 128A, 130A of the inner and outer spacers 104A, 106A and is configured to receive the second pin 134A. The first latch member 28A defines a latch hook 148A extending from a first end of the body 146A. The latch hook 148A is shaped to engage with the retention hook 90A of the retention member 80A when the first latch assembly 12A is in an engaged position. The latch member 28A is configured to be rotatable about the second pin 134A between the engaged position and a disengaged position, as discussed in more detail below.

A spring 152A is positioned to wrap around the body 146A of the first latch member 28A. The spring 152A is configured to bias the first latch member 28A into the engaged position. The spring 152A is positioned between the inner and outer spacers 104A, 106A. The spring 152A includes first and second ends 156A, 158A operably coupled with the inner and outer spacers 104A, 106A. For example, as illustrated, each of the inner and outer spacers 104A, 106A may include a notch 162A, 164A configured to receive one of the first and second ends 156A, 158A of the spring 152A.

With continued reference to FIGS. 2A and 3A, a release arm 168A extends from a second end of the body 146A of the first latch member 28A. As illustrated, the release arm 168A may be positioned opposite the latch hook 148A. The release arm 168A may further be substantially arcuate. However, it is contemplated that the release arm 168A may extend from any end of the body 146A of the first latch member 28A and may have any shape without departing from the scope of the present disclosure.

The release arm 168A extends to at least partially align with the first release assembly 20A. The release arm 168A defines an arm opening 172A configured to be aligned with the first release assembly 20A to couple the first release assembly 20A with the release arm 168A of the first latch member 28A.

The first release assembly 20A includes the first latch link 22A. The first latch link 22A is substantially linear and includes first and second ends 178A, 180A. The first end 178A of the first latch link 22A is aligned with the release arm 168A. The first latch link 22A defines a first aperture 184A proximate the first end 178A and a second aperture 186A proximate the second end 180A. The first aperture 184A is configured to align with the arm opening 172A of the release arm 168A. A first connector 190A extends through the first aperture 184A of the first latch link 22A and the arm opening 172A of the release arm 168A to couple the release arm 168A of the first latch member 28A with the first latch link 22A.

Referring still to FIGS. 2A and 3A, the first release assembly 20A further includes the first rod link 24A. The first rod link 24A may be shaped and sized similarly to the first latch link 22A. However, it is contemplated that the first rod link 24A and the first latch link 22A may be different sizes. The first rod link 24A is substantially linear and has first and second ends 194A, 196A. The first end 194A of the first rod link 24A is aligned with the second end 196A of the first latch link 22A. The first rod link 24A defines a first opening 200A proximate the first end 194A and a second opening 202A proximate the second end 196A. The first opening 200A is configured to be aligned with the second aperture 186A of the second end 180A of the first latch link 22A. A second connector 204A extends through the first opening 200A and the second aperture 186A to couple the first rod link 24A with the first latch link 22A. The first latch link 22A and the rod link 24A are configured to rotate about the second connector 204A.

The second end 196A of the first rod link 24A is fixedly coupled with the first end 26A of the toque rod 18 such that rotation of the first rod link 24A causes simultaneous rotation of the toque rod 18. In various examples, the toque rod 18 may be supported by a bracket 206A operably coupled with the side 14A of the seat base frame 16. In other examples, the toque rod 18 may be supported by the first rod link 24A and/or the first release assembly 20A. In still other examples, the toque rod 18 may be supported by one or both of the first mounting plate 42A and the first support plate 40A.

Figure 4A:
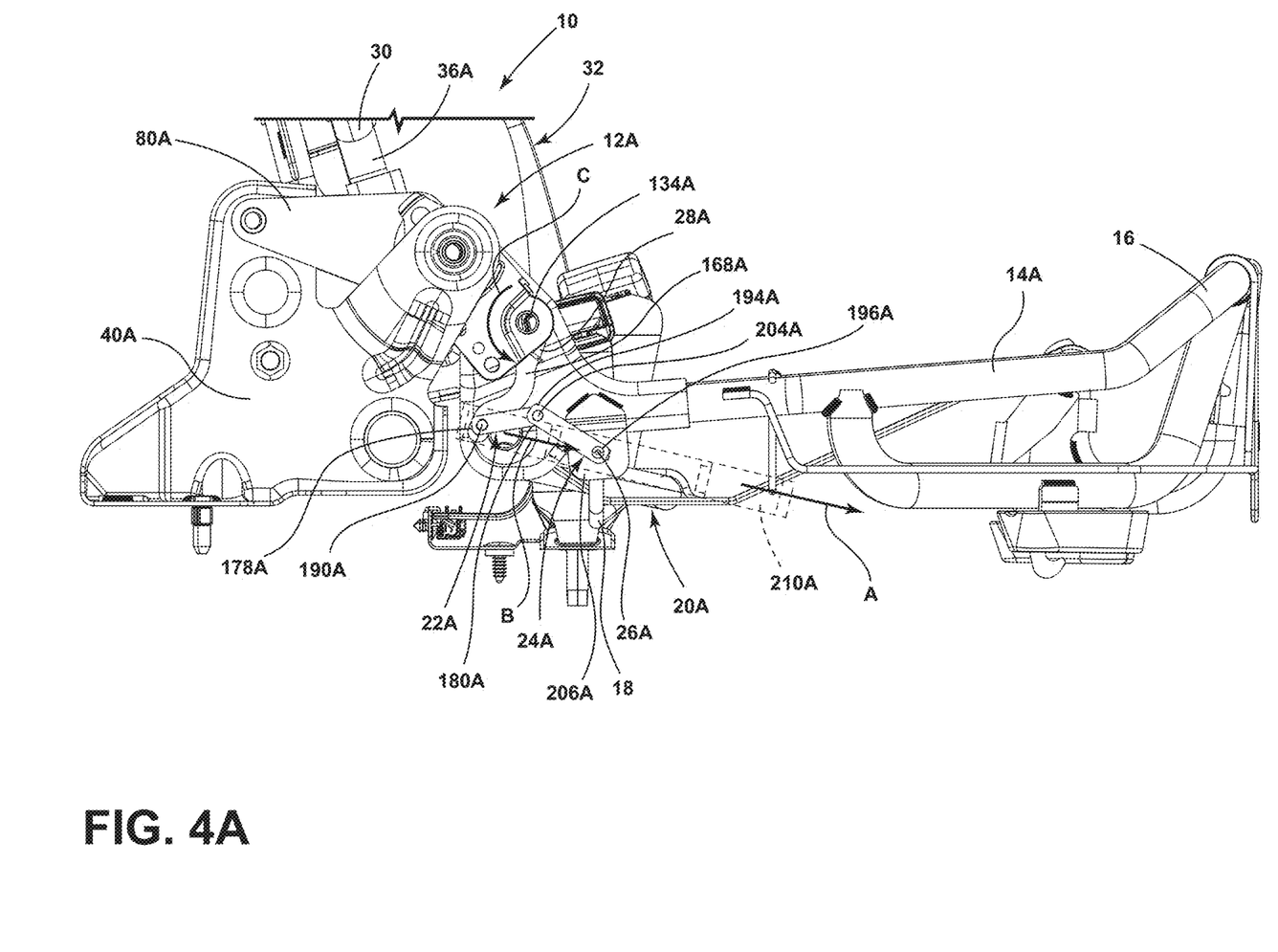
FIG. 4A is a side elevational view of the first latch assembly of FIG. 2A in a first position.

Referring now to FIGS. 2A, 3A, and 4A, an actuator 210A is operably coupled with the first release assembly 20A. The actuator 210A is configured to provide a forward pulling force A on to the latch link 22A (FIG. 4A). The actuator 210A may be any actuator 210A such as, for example, a strap, a wire, or a lever configured to apply the forward pulling force A. The actuator 210A may be coupled with the first latch link 22A at the first end 178A. For example, the actuator 210A may be coupled with the first connector 190A.

Referring now to FIGS. 4A and 5A, when the forward force A is applied to the actuator 210A, the actuator 210A is pulled towards a front of the seat base frame 16. The forward force A is applied at the first connector 190A and pulls the first end 178A of the first latch link 22A toward the front of the seat base frame 16. The movement of the first end 178A of the first latch link 22A toward the front of the seat base frame 16 simultaneously applies a force B to the release arm 168A of the first latch member 28A that pulls the release arm 168A toward the front of the seat base frame 16. The force B on the release arm 168A causes the first latch member 28A to rotate about the second pin 134A (arrow C). The rotation of the first latch member 28A moves the first latch member 28A from the engaged position (FIG. 4A) to the disengaged position (FIG. 5A).

Figure 4B:
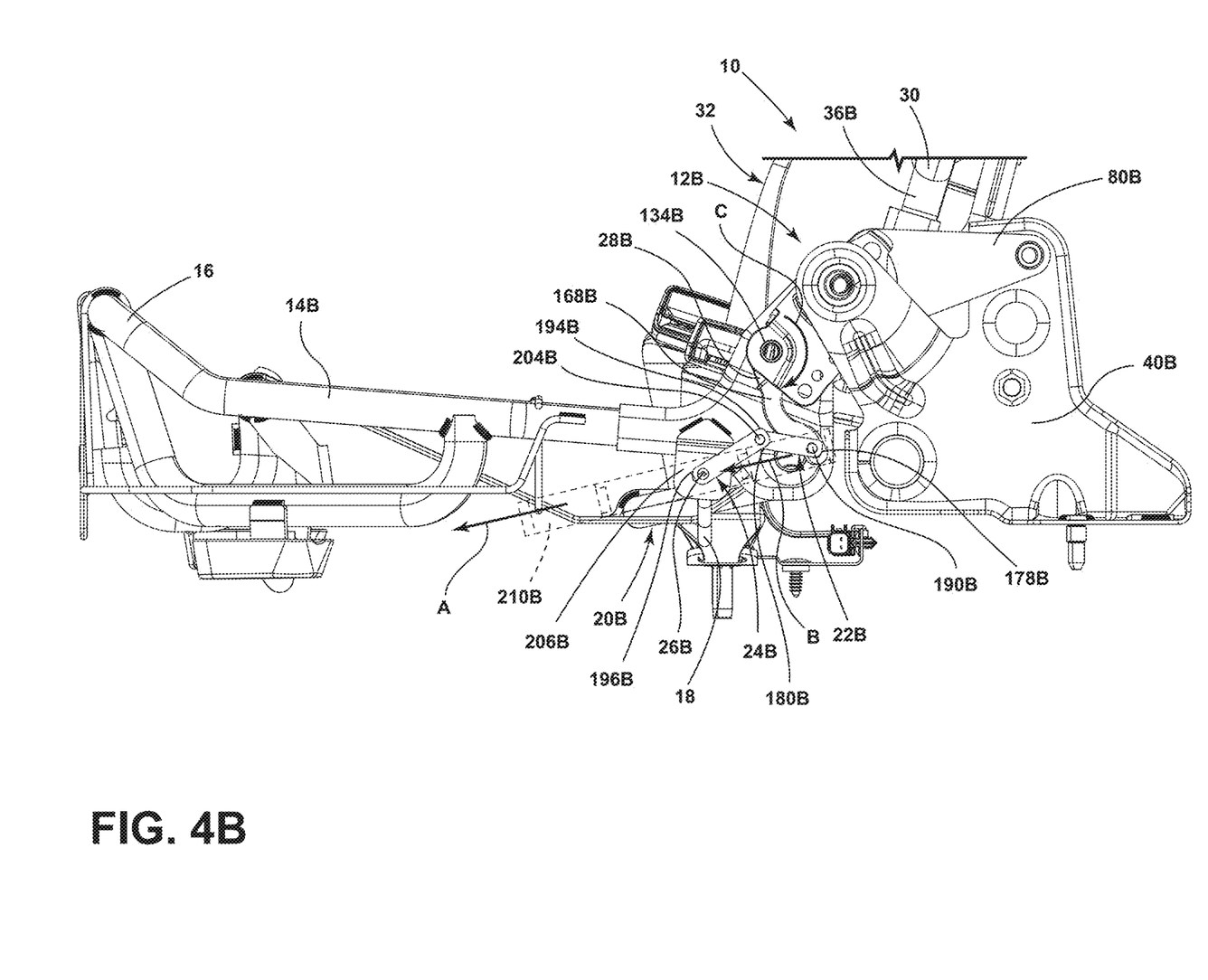
FIG. 4B is a side elevational view of the second latch assembly of FIG. 2B in a first position.

The movement of the first end 178A of the first latch link 22A toward the front of the seat base frame 16 further pushes the second end 180A of the first latch link 22A upward. The first end 194A of the first rod link 24A and the second connector 204A are also pushed upward along arrow D. The upward movement of the first end 194A of the first rod link 24A causes the second end 196A of the first rod link 24A to rotate, as illustrated by arrow F. The rotation of the second end 196A of the first rod link 24A results in a simultaneous rotation of the toque rod 18 (arrow G). The rotation of the toque rod 18 translates the rotational force applied at the first end 26A of the toque rod 18 to the second end 26B of the toque rod 18 (FIGS. 4B and 5B). The translation results in simultaneous and mirrored actuation of the second release assembly 20B and second latch assembly 12B with the first release assembly 20A and first latch assembly 12A. The simultaneous actuation of the first and second release assemblies 20A, 20B and the first and second latch assemblies 12A, 12B allows a single actuator 210A, 210B to release both the first and second latch assemblies 12A, 12B simultaneously. While the actuator 210A of the first release assembly 20A is described as applying the force A, it is contemplated that the actuator 210B of the second latch assembly 12B may also be used to release both the first and second latch assemblies 12A, 12B in the same manner.

It will be understood by one having ordinary skill in the art that construction of the described disclosure and other components is not limited to any specific material. Other exemplary embodiments of the disclosure disclosed herein may be formed from a wide variety of materials, unless described otherwise herein.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A vehicle seat frame comprising:
   a seat base frame rotatably coupled with a support plate about a rotation axis of the seat base frame;
   a latch assembly operably coupled with the seat base frame and the support plate, the latch assembly including:
      a latch member rotatably coupled with the seat base frame and the support plate about the rotation axis of the seat base frame; and
      a retention member fixedly coupled with the support plate, wherein the latch member is selectively engaged with the retention member;
   a release assembly operably coupled with the latch member and including:
      a latch link having a first end coupled with the latch assembly; and
      a rod link rotatably coupled with a second end of the latch link and a torque rod; and
   an actuator configured to move a first end of the latch link towards a front of the seat base frame when a forward force is applied to the actuator.

2. The vehicle seat frame of claim 1, wherein the latch member is configured to be rotated between an engaged position and a disengaged position.

3. The vehicle seat frame of claim 2, further comprising:
   a spring coupled with the latch member and configured to bias the latch member into the engaged position.

4. The vehicle seat frame of claim 1, wherein the latch member is operably coupled with the first end of the latch link.

5. The vehicle seat frame of claim 1, wherein movement of the first end of the latch link towards the front of the seat base frame is configured to push the second end of the latch link upward.

6. The vehicle seat frame of claim 5, wherein an upward movement of the second end of the latch link is configured to rotate an end of the rod link and the torque rod.

7. The vehicle seat frame of claim 1, further comprising: inner and outer spacers positioned on opposing sides of the latch member and spaced apart by a stop.

8. The vehicle seat frame of claim 7, wherein the retention member defines a guide configured to receive the stop.

9. The vehicle seat frame of claim 8, wherein the stop is configured to move along the guide and limit rotation of the latch assembly.

10. The vehicle seat frame of claim 1, wherein the retention member defines a retention hook and the latch member defines a latch hook configured to be engaged with the retention hook when the latch member is in the engaged position.

\* \* \* \* \*